(12) United States Patent
Purves et al.

(10) Patent No.: US 11,568,392 B2
(45) Date of Patent: *Jan. 31, 2023

(54) DYNAMIC CHECKOUT BUTTON APPARATUSES, METHODS AND SYSTEMS

(71) Applicant: VISA INTERNATIONAL SERVICE ASSOCIATION, San Francisco, CA (US)

(72) Inventors: Thomas Purves, San Francisco, CA (US); Clint Florez, Foster City, CA (US); Amit Gupta, Foster City, CA (US); Aparna Krishnan Girish, Foster City, CA (US); Peng Zhao, San Francisco, CA (US); Chunxi Jiang, San Francisco, CA (US); Sang Wook Lee, San Francisco, CA (US); Kevin Carvalho, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/234,104

(22) Filed: Apr. 19, 2021

(65) Prior Publication Data
US 2021/0304192 A1 Sep. 30, 2021

Related U.S. Application Data

(63) Continuation of application No. 16/438,085, filed on Jun. 11, 2019, now Pat. No. 11,004,064, which is a
(Continued)

(51) Int. Cl.
*G06Q 30/00* (2012.01)
*G06Q 20/36* (2012.01)
(Continued)

(52) U.S. Cl.
CPC ............ *G06Q 20/36* (2013.01); *G06Q 20/12* (2013.01); *G06Q 20/367* (2013.01); *G06Q 30/0207* (2013.01)

(58) Field of Classification Search
None
See application file for complete search history.

(56) References Cited

U.S. PATENT DOCUMENTS

| 2011/0265157 A1 | 10/2011 | Ryder |
| 2013/0152007 A1 | 6/2013 | Costenaro |
(Continued)

FOREIGN PATENT DOCUMENTS

| AU | 2014202932 A1 | 12/2014 |
| CN | 102842081 A | 12/2012 |
(Continued)

OTHER PUBLICATIONS

Gaskins, Adam, Window XP: What to do if you're locked out of your computer, May 3, 2010, YouTube, https://www.youtube.com/watch?v=JaoFgeguyQ8 (Year: 2010).*

(Continued)

*Primary Examiner* — Jeffrey A. Smith
*Assistant Examiner* — Timothy J Kang
(74) *Attorney, Agent, or Firm* — Loeb & Loeb LLP

(57) ABSTRACT

The DYNAMIC CHECKOUT BUTTON APPARATUSES, METHODS AND SYSTEMS (DCB) transforms product page checkout request input and user identification input via DCB components such as offer/discount determination component and checkout button embedding component, into dynamic checkout button outputs.

20 Claims, 12 Drawing Sheets

Example DCB Embodiments

Related U.S. Application Data continuation of application No. 15/224,231, filed on Jul. 29, 2016, now Pat. No. 10,380,582.

(60) Provisional application No. 62/199,033, filed on Jul. 30, 2015.

(51) Int. Cl.
*G06Q 30/02* (2012.01)
*G06Q 20/12* (2012.01)

(56) References Cited

U.S. PATENT DOCUMENTS

| | | |
|---|---|---|
| 2013/0254115 A1 | 9/2013 | Pasa |
| 2014/0074655 A1* | 3/2014 | Lim .................. G06Q 20/3265 705/26.1 |
| 2014/0324690 A1* | 10/2014 | Allen ................. H04M 3/5183 705/41 |
| 2015/0100417 A1 | 4/2015 | Girish |
| 2016/0094495 A1 | 3/2016 | Ahuja |
| 2017/0032361 A1 | 2/2017 | Purves |
| 2019/0295067 A1 | 9/2019 | Purves |

FOREIGN PATENT DOCUMENTS

| | | |
|---|---|---|
| CN | 103797500 A | 5/2014 |
| WO | 2014210227 A1 | 12/2014 |

OTHER PUBLICATIONS

Guo, Qinglian, Iconographical Virtual Polyhedrons for Constructing Graphical User Interface, Jan. 1, 2004, Proceedings Computer Graphics International, pp. 497-504 (Year: 2004).*

Gaskins, Adam, Windows XP: What to do if you're locked out of your computer, May 3, 2010, YouTube, https://www.youtube.com/watch?v=JaoFgeguyQ8 (Year: 2010), 2 pages.

International Searching Authority, International Search Report and Written Opinion issued in International Application No. PCT/US16/044581, dated Oct. 20, 2016, 6 pages.

Notice of Allowance dated Jan. 13, 2021 for U.S. Appl. No. 16/438,085 (pp. 1-7).

Notice of Allowance dated May 15, 2019 for U.S. Appl. No. 15/224,231 (pp. 1-9).

Office Action dated Dec. 3, 2018 for U.S. Appl. No. 15/224,231 (pp. 1-15).

Office Action dated Sep. 8, 2020 for U.S. Appl. No. 16/438,085 (pp. 1-8).

Chinese Office Action (with partial English translation) for App. No. CN201680044450.8, dated Jan. 29, 2022, 9 pages.

Chinese Office Action (with partial English translation) for App. No. CN201680044450.8, dated Aug. 12, 2021, 12 pages.

Chinese Office Action (with English translation) issued in App. No. CN201680044450.8, dated Jun. 15, 2022, 10 pages.

* cited by examiner

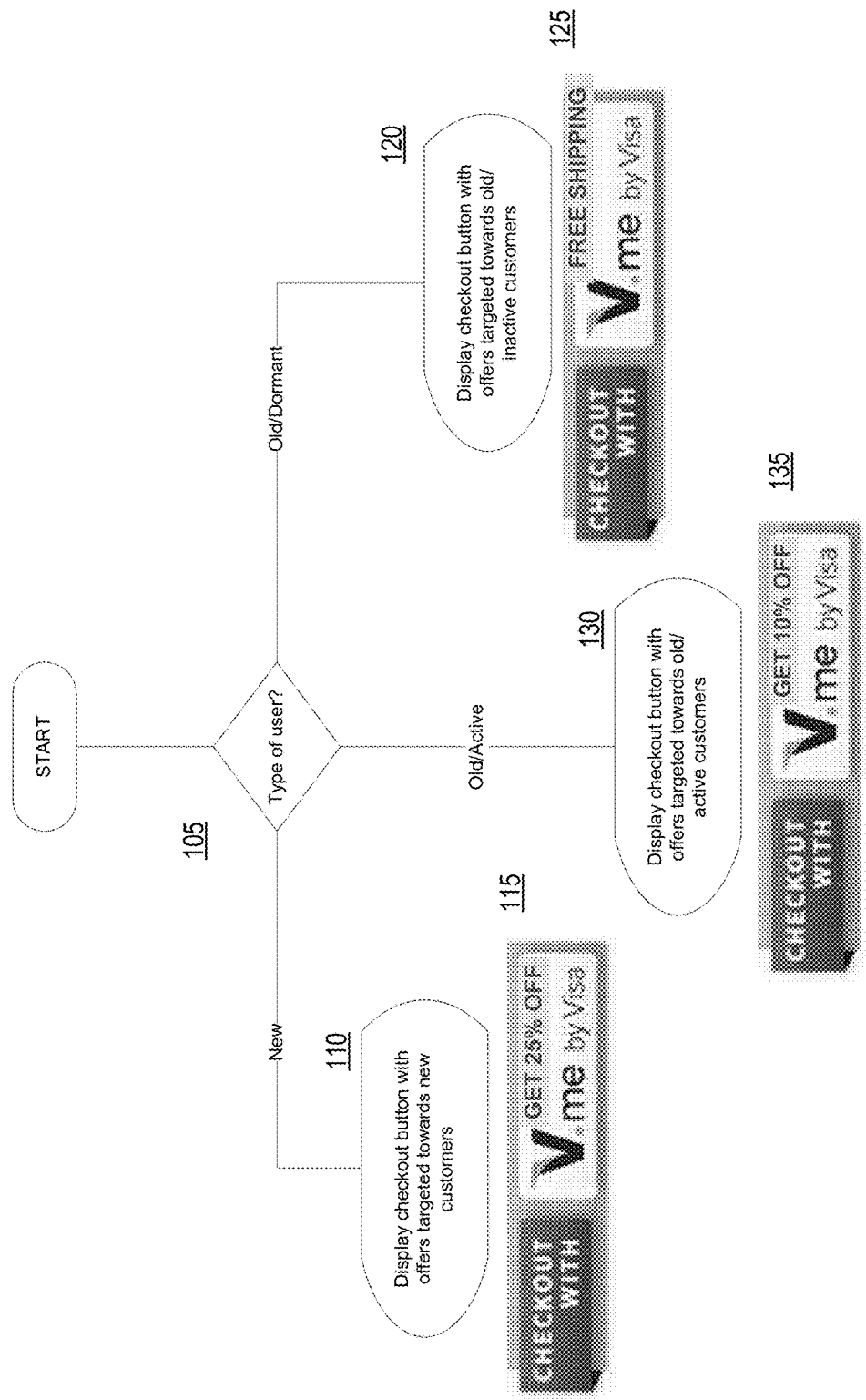
FIGURE 1A  Example DCB Embodiments

Example DCB components

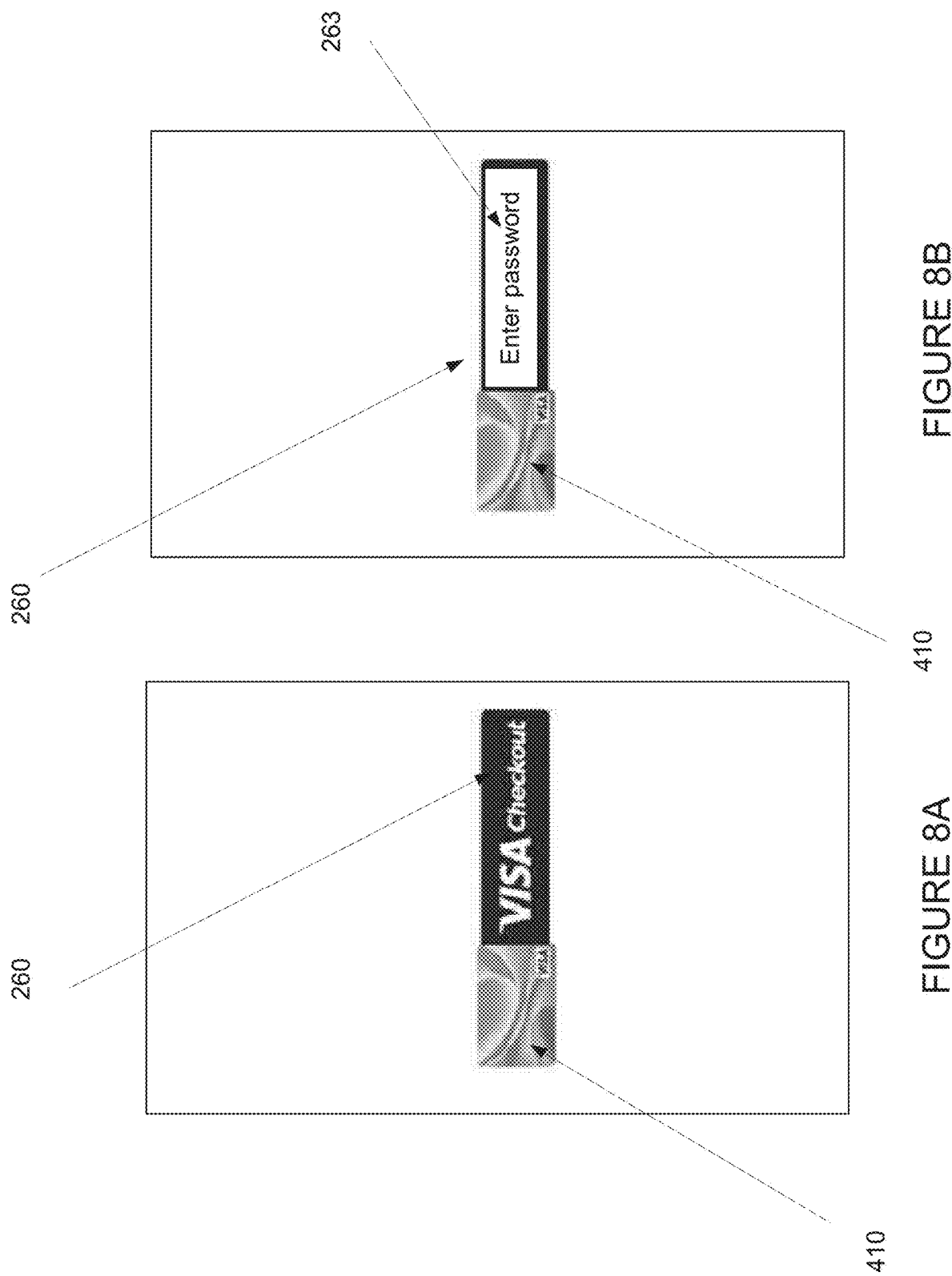

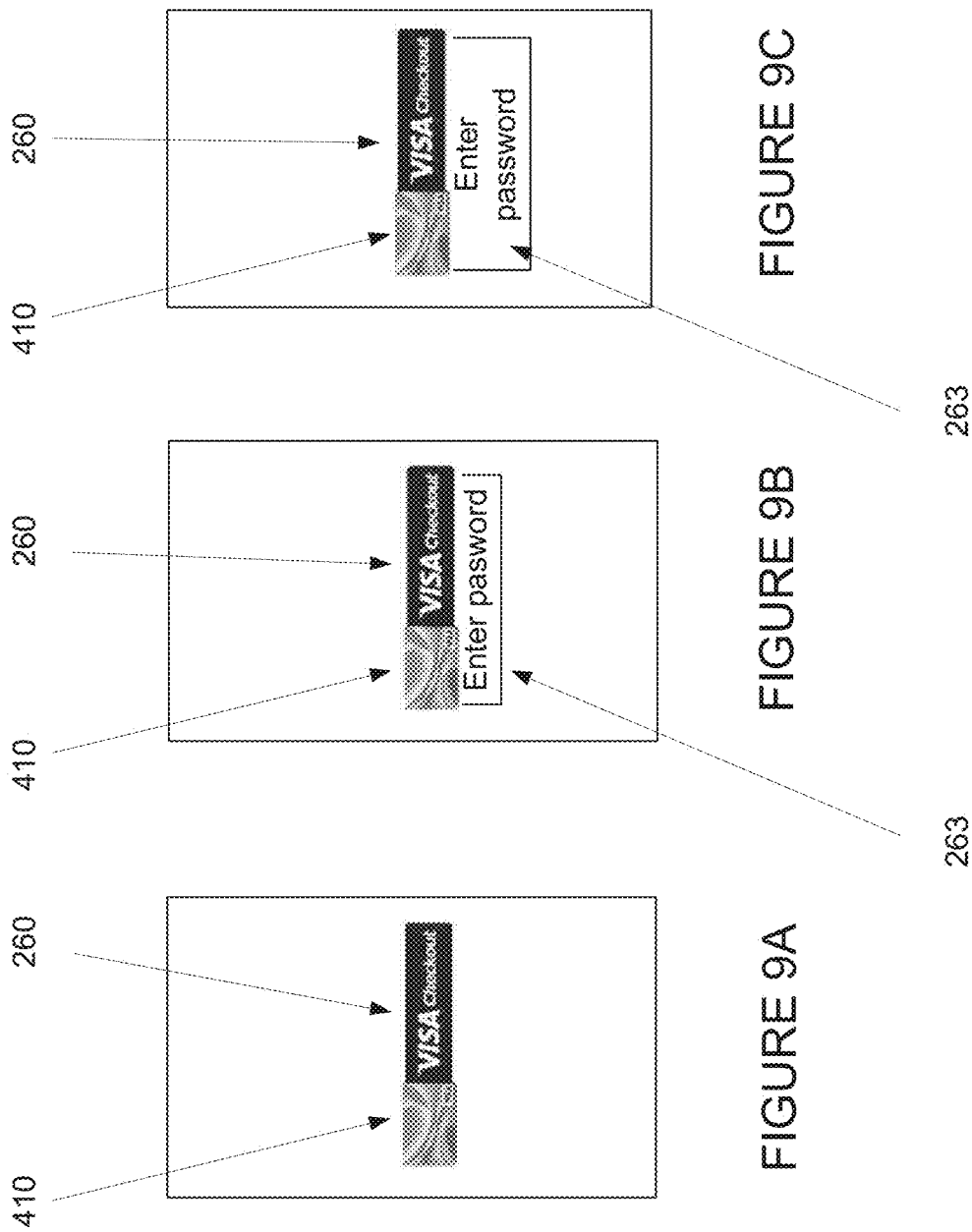

DYNAMIC CHECKOUT BUTTON APPARATUSES, METHODS AND SYSTEMS

CROSS-REFERENCE TO RELATED APPLICATION

This application is a continuation of U.S. patent application Ser. No. 16/438,085, entitled "DYNAMIC CHECKOUT BUTTON APPARATUSES, METHODS AND SYSTEMS," filed Jun. 11, 2019, which is a continuation of U.S. patent application Ser. No. 15/224,231, entitled "DYNAMIC CHECKOUT BUTTON APPARATUSES, METHODS AND SYSTEMS," filed Jul. 29, 2016, now U.S. Pat. No. 10,380,582, and claims the benefit of, and priority to, U.S. Provisional Patent Application Ser. No. 62/199,033, entitled "DYNAMIC CHECKOUT BUTTON APPARATUSES, METHODS AND SYSTEMS," filed Jul. 30, 2015, the entire contents of which are incorporated herein by reference in their entirety.

This application describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present application is directed generally to e-commerce and digital wallets, and more particularly, to graphical user interfaces for DYNAMIC CHECKOUT BUTTON APPARATUSES, METHODS AND SYSTEMS (DCB).

BACKGROUND

Consumers using the World Wide Web browse product listings of merchants and make purchases on selected products. Discounts are offered to consumers for their purchases. Consumers may use several payment accounts but they often are confused over which account to use or which image represents which account. The confusion may become even greater when the consumer is using a mobile device where the screen is small and details are difficult to see. At the same time, new user interfaces may present an opportunity to create an improved and memorable user experience, which may by itself draw additional users.

SUMMARY

The present application discloses a computer system for generating graphical user interfaces. The computer system includes at least one central processor physically configured according to computer executable instructions, and a memory for storing computer executable instructions and an input output circuit. The central processor is configured for: receiving, using one or more data processors, a product page checkout request; querying, using the one or more processors, for information associated with a merchant and a user; and generating, using the one or more processors, data to be embedded into a wallet-associated checkout button. The data includes one or more dynamic images and the one or more dynamic images represent one or more financial accounts. The central processor is also configured for: receiving, using the one or more processors, a payment request and generating, using the one of more processors, an additional graphical user interface to receive password data where the additional graphical user interface is related to the wallet-associated checkout button.

The present application also discloses a dynamic checkout button processor-implemented method. The method includes the steps of: receiving, using one or more processors, a product page checkout request; querying, using the one or more processors, for information associated with a merchant and a user; and, generating, using the one or more processors, data to be embedded into a wallet-associated checkout button. The data includes one or more dynamic images and the one or more dynamic images represent one or more financial accounts. The method also includes the steps of receiving, using the one or more processors, a payment request and generating, using the one of more processors, an additional graphical user interface to receive password data where the additional graphical user interface is related to the wallet-associated checkout button.

BRIEF DESCRIPTION OF THE DRAWINGS

The accompanying appendices and/or drawings illustrate various non-limiting, example, innovative aspects in accordance with the present descriptions:

FIGS. 1A-1B show block diagrams illustrating example embodiments of the DCB;

FIGS. 8A and 8B shows an illustration of a checkout button changing into a graphical user input field;

FIGS. 9A-9C shows an illustration of a checkout button changing into an additional graphical user input display;

DETAILED DESCRIPTION

DCB

Figure 1B:
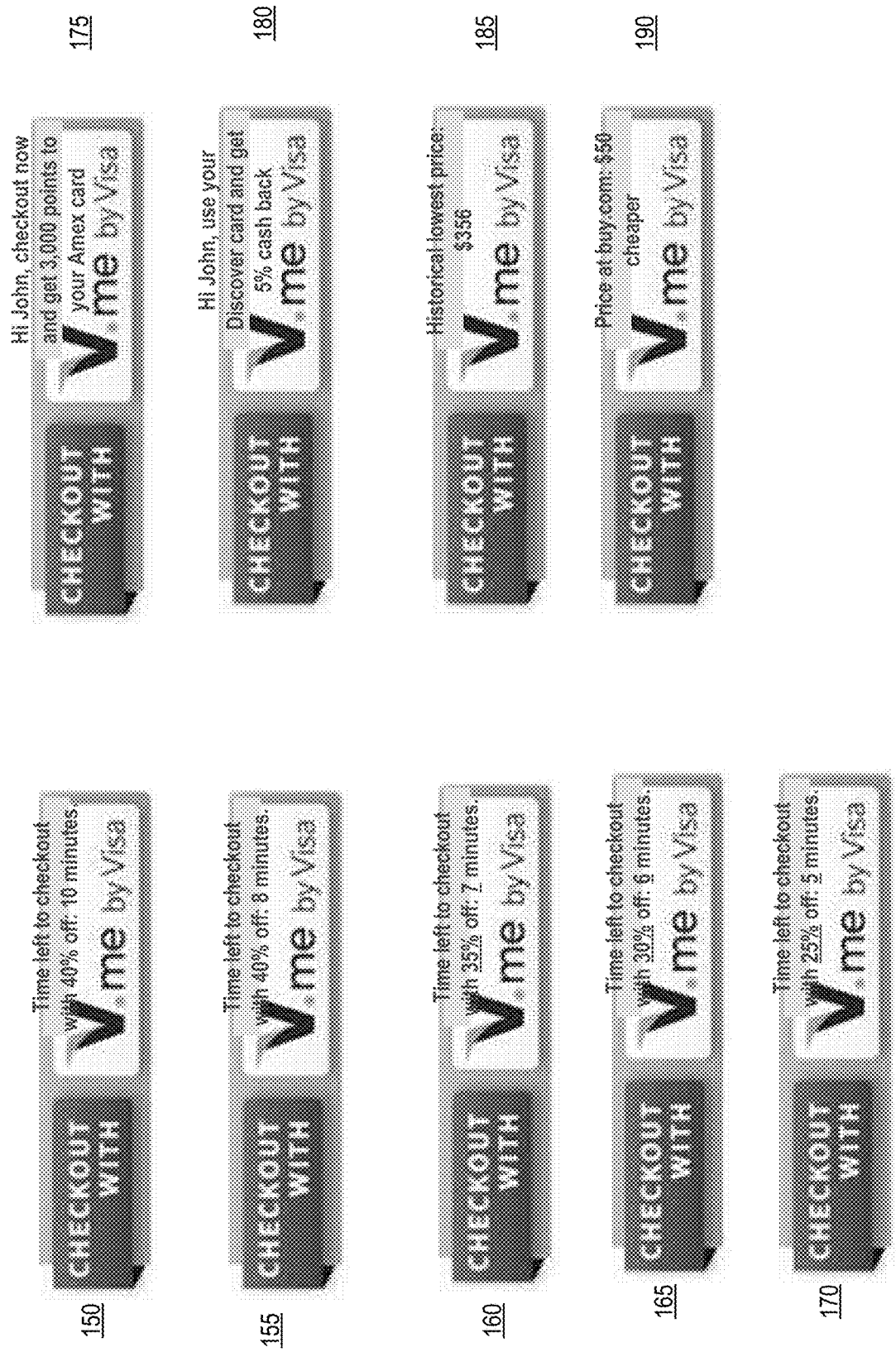

The DYNAMIC CHECKOUT BUTTON APPARATUSES, METHODS AND SYSTEMS (DCB) transforms inputs such as product page checkout request and user identification input (e.g., 211) via DCB components such as offer/discount determination component 841 and checkout button 260 embedding component 842, into dynamic checkout button (e.g., 260) outputs. FIG. 1A shows a block diagram illustrating example embodiments of the DCB. In some embodiments, the DCB may determine the type of user 105. If the user is a new user, the DCB may display the wallet checkout button 260 with offers targeted towards new customers 110, e.g., get 25% off 115. If the user is an existing and active user, the DCB may display checkout button 260 with offers targeted towards existing/active customers 130, e.g., get 10% off 135. If the user is an existing but dormant user, the DCB may display checkout button 260 with offers targeted towards old/inactive customers 120, e.g., get free shipping when purchase 125.

FIG. 1B shows a block diagram illustrating example offers/discounts embedded in the wallet checkout button 260 in some embodiments of the DCB. In some embodiments, the discount/offer may come with a timer which shows how much time left for the discount/offer to be active. For example, it may show "time left to checkout with 40% off is 10 minutes" 150, and time left may count down 155. The discount/offer may also change as the time counts down. For example, the discount may change from 35% off at 7 minutes 160 to 30% off at 6 minutes 165, and 25% off at 5 minutes 170, etc. In some embodiments, the discount/offer may also be customizable and user specific, as the DCB may have access to the user's wallet account which stores the user's profile information, payment methods information, shipping address, and/or the like. For example, it may display a message like "Hi John, checkout now and get 3000 points to your Amex card." 175 For another example, it may display a message such as "Hi John, use your Discover card and get 5% cash back on your purchase" 180. The DCB may also do analytics on the merchant's site or across the web and display such analytics that's of interest to the user. For example, it may display a message which shows historical lowest price of the product on this merchant site 185. For another example, it may display a lower price at another merchant 190.

Figure 2:
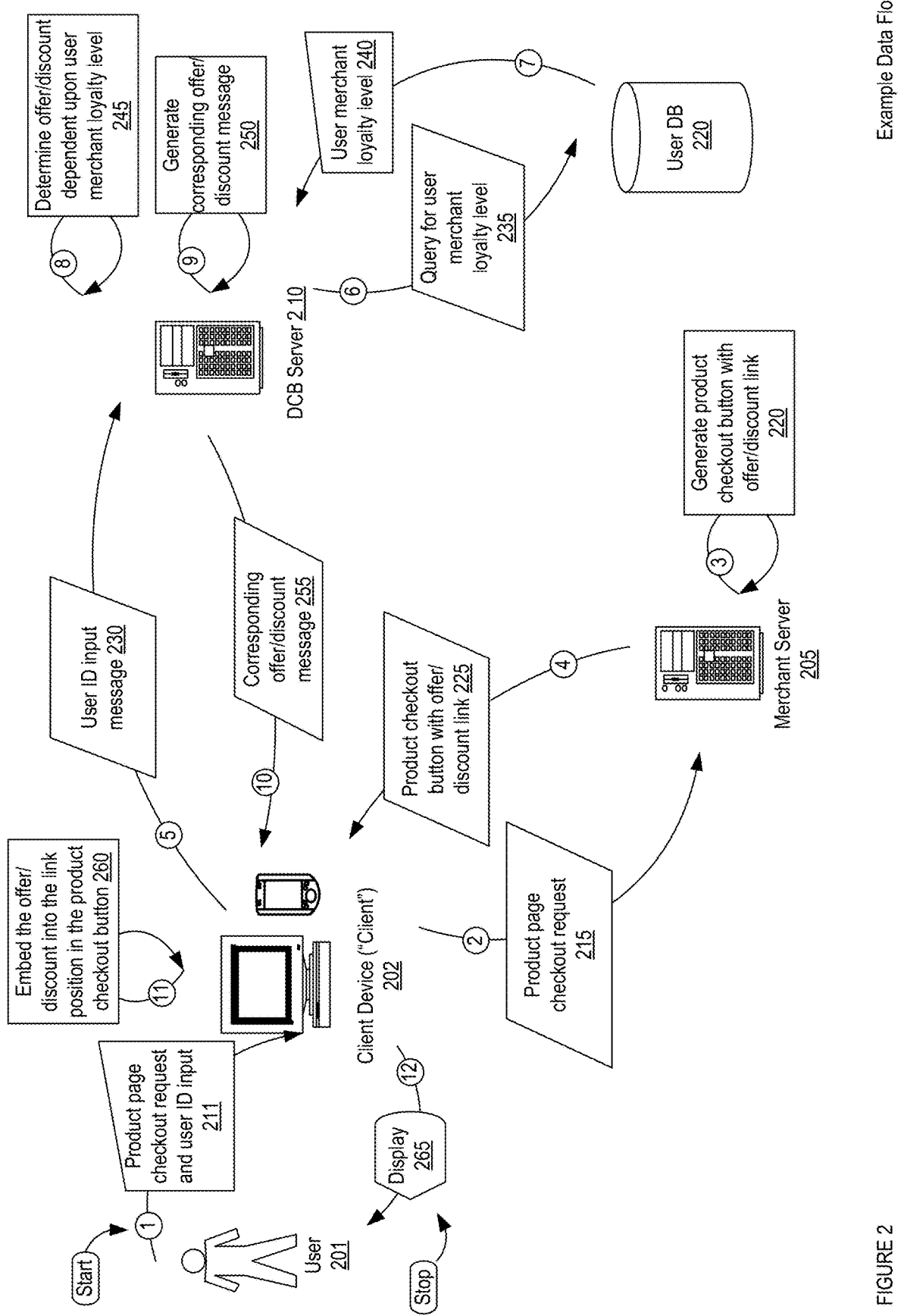
FIG. 2 shows a block diagram illustrating example data flow in some embodiments of the DCB.

FIG. 2 shows a block diagram illustrating example data flow in some embodiments of the DCB. In some embodiments, the user 201 (e.g., consumer) may send a product page checkout request and user identification input 211 to the client 202 (e.g., mobile devices, computer, Point-of-Sale, laptop, and/or the like). The client 202 may further send the product page checkout request 215 to the merchant server 205. For example, the merchant server 205 may provide a HTTP(S) GET message including an XML-formatted product page checkout request 215 similar to the example listing provided below:

```
GET /productpagecheckoutrequest.php HTTP/1.1
Host: www.merchantserver.com
Content-Type: Application/XML
Content-Length: 624
<?XML version = "1.0" encoding = "UTF-8"?>
<product_page_checkout_request>
    <session_ID>4NFU4RG94</session_ID>
    <timestamp>2001-02-22 15:22:43</timestamp>
    <wallet_login_username>jsmith@wallet.com</wallet_username>
    <wallet_login_password>xxxxxx<wallet_login_password>
    <merchant_ID>www.macys.com</merchant_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <product_info>
        <cart_id>45234</card_id>
        <product_id>123
            <product_name>book</product_name>
            <product_price>$12</product_price>
        </product_id>
        <product_id>456
            <product_name>boots</product_name>
            <product_price>$433</product_price>
        </product_id>
    </product_info>
</product_page_checkout_request>
```

The merchant server 205 may generate product checkout button 260 with offer/deal link to be embedded 220. The merchant server 205 may then send the product checkout button 260 with offer/deal link to be embedded 225 to the client. For example, the merchant server may provide a HTTP(S) POST message including an XML-formatted product checkout button 260 with offer/discount link message 225 similar to the example listing provided below:

```
<html>
 <head>
  <script type="text/javascript">
  /**
  inputData is the JSON object: {amount: .., city: .., state: ..,....}
  resumeFunction is what you call after you figured the summary details.
  **/
  function myBeforeSummaryFunction(inputData, resumeFunction){
    $.ajax({
      url: '/path/to/your/server/to/compute/the/summary',
      data: inputData,
      success: function(response){
        resumeFunction(response); //response should be the summary object
      }
    });
  }
  function myCallbackFunctionForVmeEvents(VmeEventType,
  eventData){
    var MerchantTrans = eventData.merchTrans;
    if (VmeEventType == "purchase.success"){
      alert ( msg );
      mywindow = window.open ("./checkyourorder.php?merchTrans="
      + MerchantTrans,"Check your Order ID","width=400,height=300");
      mywindow.moveTo(300,300);
    }
  }
  </script>
 </head>
 <body>
  <v:init apikey="CG6KBNNKJ5ZSSJC5XTEX">
  </v:init>
  <v:buy
    apikey = "aK2Leiv89j2A1_lOn4s1"
    token = "12f049788f4b67dc9cc58529769fb9d2"
    amount = "100"
    currency = "USD"
    product-id = "cart-2536"
    before-summary="myBeforeSummaryFunction"
    callback="myCallbackFunction"
    collect-shipping="true"
    process="validate"
  </v:buy>
  <div id="v-root"></div>
  <script type="text/javascript" src="
  https://sandbox-static.v.me/js/1/v-widgets.js">
  </script>
  <offer_link>link to DCB server decided offer</offer_link>
 </body>
```

Upon receiving the user identification input, the client 202 may send the user identification input message to 230 to the DCB server 210. The DCB server 210 may generate and send a query to the user database 220 for user merchant loyalty level 235. For example, the database 220 may be a relational database responsive to Structured Query Language ("SQL") commands. The DCB server 210 may execute a hypertext preprocessor ("PHP") script including SQL commands to query the database for user merchant loyalty level. An example PHP/SQL command listing, illustrating substantive aspects of querying the user database 235, is provided below:

```
<?PHP
header('Content-Type: text/plain');
mysql_connect("254.93.179.112",$DBserver,$password); // access database server
mysql_select_db("customerprofile.SQL"); // select database table to search
```

```
//create query for user merchant loyalty level data
$query = "SELECT user_merchant_loyalty_level FROM
CustomerProfileTable WHERE user_ID LIKE '%' $123abc";
$result = mysql_query($query); // perform the search query
mysql_close("customerprofile.SQL"); // close database access
?>
```

Upon receiving the user merchant loyalty level 240, the DCB server 210 may determine offer/deal dependent upon user merchant loyalty level 245. For example, the user merchant loyalty level data may show that the user is a new user, the DCB server 210 may determine an offer/discount for new users. The user merchant loyalty level data may also include user profile information and/or any other information stored in the user's wallet. Therefore, the offer/discount message may also include any information from the user's wallet. The DCB server may also determine other user specific behavior based on the information stored in wallet (e.g., 150, 155, 160, 165, 170, 175, 180, 185, 190, and/or the like). Once the DCB server 210 determine the offer/discount 245, the DCB server 210 may continue to generate corresponding offer/discount message 250. The DCB server 210 may further send the corresponding offer/deal message 255 to the client 202. For example, the DCB server 210 may provide a HTTP(S) POST message including an XML-formatted corresponding offer/deal message 255 similar to the example listing provided below:

```
POST /correspondingoffermessage.php HTTP/1.1
Host: www.DCBserver.com
Content-Type: Application/XML
Content-Length: 624
<?XML version = "1.0" encoding = "UTF-8"?>
<corresponding_offer_message>
    <session_ID>4NFU4RG94</session_ID>
    <timestamp>2001-02-22 15:22:43</timestamp>
    <wallet_login_username>jsmith@wallet.com</wallet_username>
    <wallet_login_password>xxxxxx</wallet_login_password>
    <merchant_ID>www.macys.com</merchant_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <offer_link>25% off</offer_link>
</corresponding_offer_message>
```

The client 202 may embed the offer/discount into the link position in the product checkout button 260, for display 265. An example HTTP message may be as follows:

```
<html>
 <head>
  <script type="text/javascript">
  /**
  inputData is the JSON object: {amount: .., city: .., state: ..,.....}
  resumeFunction is what you call after you figured the summary details.
  **/
  function myBeforeSummaryFunction(inputData, resumeFunction){
    $.ajax({
      url: '/path/to/your/server/to/compute/the/summary',
      data: inputData,
      success: function(response){
        resumeFunction(response); //response should be the summary object
      }
    });
  }
  function myCallbackFunctionForVmeEvents(VmeEventType,
  eventData){
    var MerchantTrans = eventData.merchTrans;
    if (VmeEventType == "purchase.success"){
      alert ( msg );
      mywindow = window.open ("./checkyourorder.php?merchTrans="
      + MerchantTrans,"Check your Order ID","width=400,height=300");
      mywindow.moveTo(300,300);
    }
  }
  </script>
 </head>
 <body>
  <v:init apikey="CG6KBNNKJ5ZSSJC5XTEX">
  </v:init>
  <v:buy
    apikey = "aK2Leiv89j2A1_lOn4s1"
    token = "12f049788f4b67dc9cc58529769fb9d2"
    amount = "100"
    currency = "USD"
    product-id = "cart-2536"
    before-summary="myBeforeSummaryFunction"
    callback="myCallbackFunction"
    collect-shipping="true"
    process="validate"
  </v:buy>
  <div id="v-root"></div>
  <script type="text/javascript" src="
  https://sandbox-static.v.me/js/1/v-widgets.js">
  </script>
<offer_link>25% off</offer_link>
</body>
```

Figure 3:
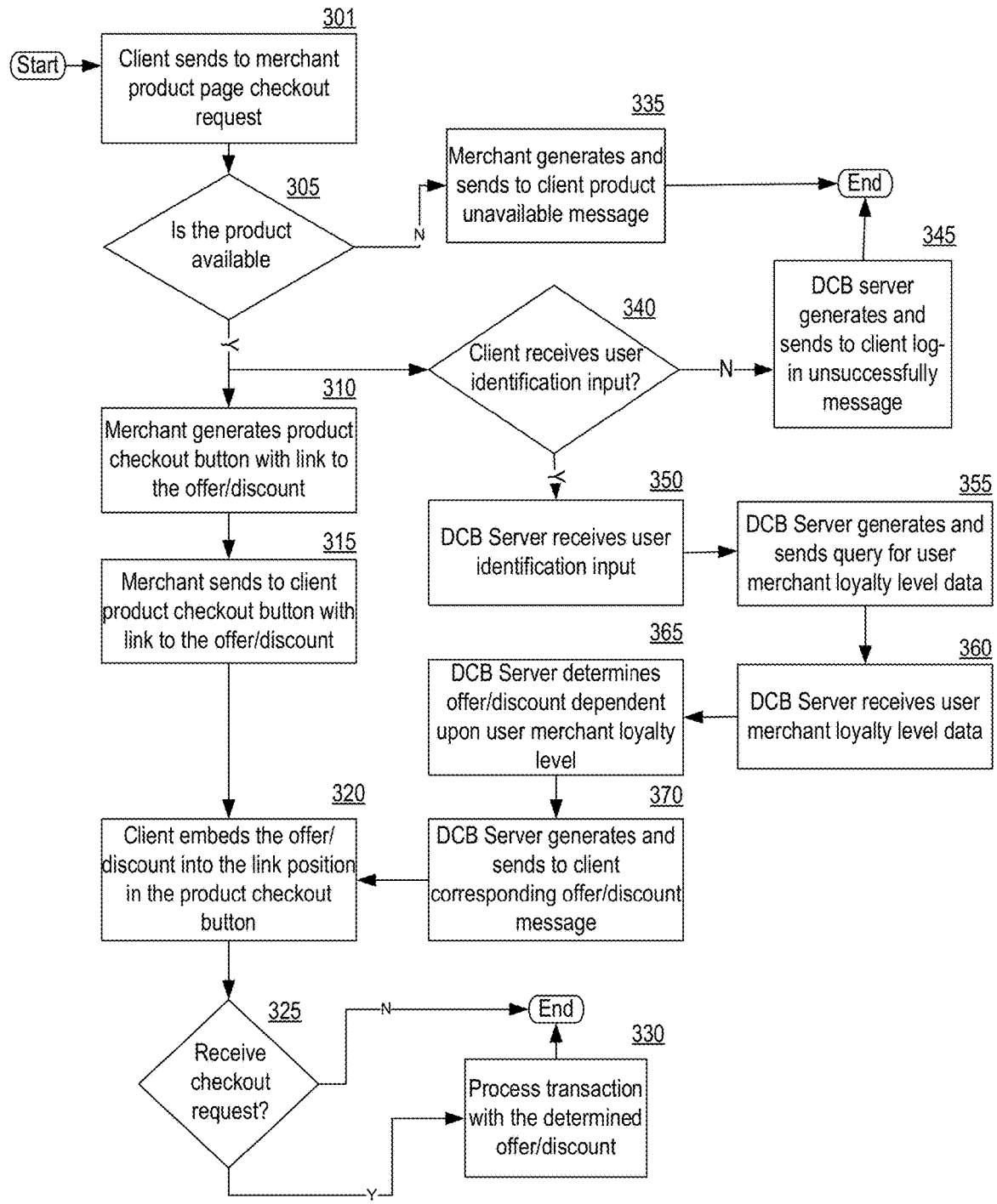
FIG. 3 shows a logic flow diagram illustrating example component in some embodiments of the DCB.

FIG. 3 shows a logic flow diagram illustrating example component in some embodiments of the DCB. In some embodiments, the client 202 may send to merchant server 205 a product page checkout request at block 301. The merchant server 205 may determine if the product is available at block 305. If the product is available, the merchant server 205 may generate and send to the client 202 a product checkout button 260 with a link to the offer/discount to be embedded at block 310. If the client 202 also receives user identification input at block 340 from the user, the client 202 may send the user identification input to the DCB server 210 at block 350. The DCB server 210 may generate and send to user database a query for user merchant loyalty level data at block 355. Upon receiving the user merchant loyalty level data at block 360, the DCB server 210 may determine offer/discount dependent upon user merchant loyalty level at block 365. The DCB server 210 may generate and send to the client 202 corresponding offer/discount message at block 370. Once the client 202 receives the product checkout button 260 with link to the offer/discount to be embedded from the merchant server 250 at block 315, and the corresponding offer/discount message from the DCB server 210 at block 370, the client 202 may embed the offer/discount into the link position in the product checkout button at block 320. Once the user is ready to checkout, the user may send the checkout request to the client at block 325 and the DCB server 210 may process transaction with the determined offer/discount at block 330. If the client 202 does not receive user identification input at block 340, the DCB server 210 may generate and send to client log-in unsuccessfully message at block 345. If the product is not available at block 305, the merchant may generate and send to client product unavailable message at block 335 and end the process.

Figure 4:
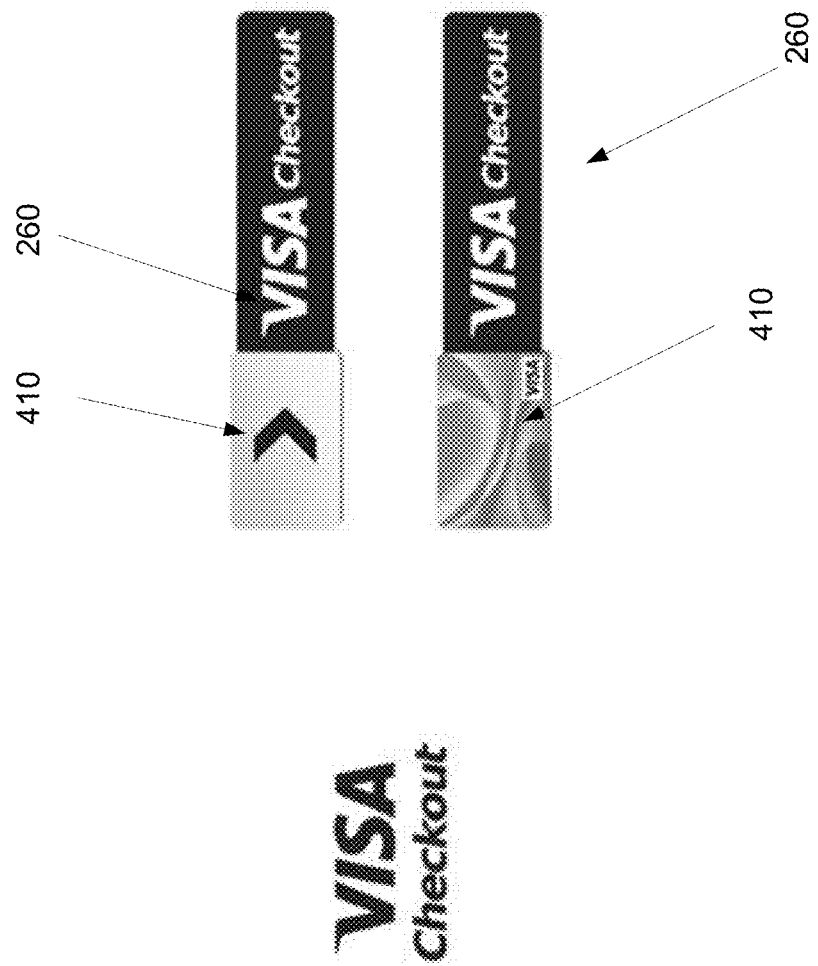
FIG. 4 shows illustrations of example card art.
Figure 5:
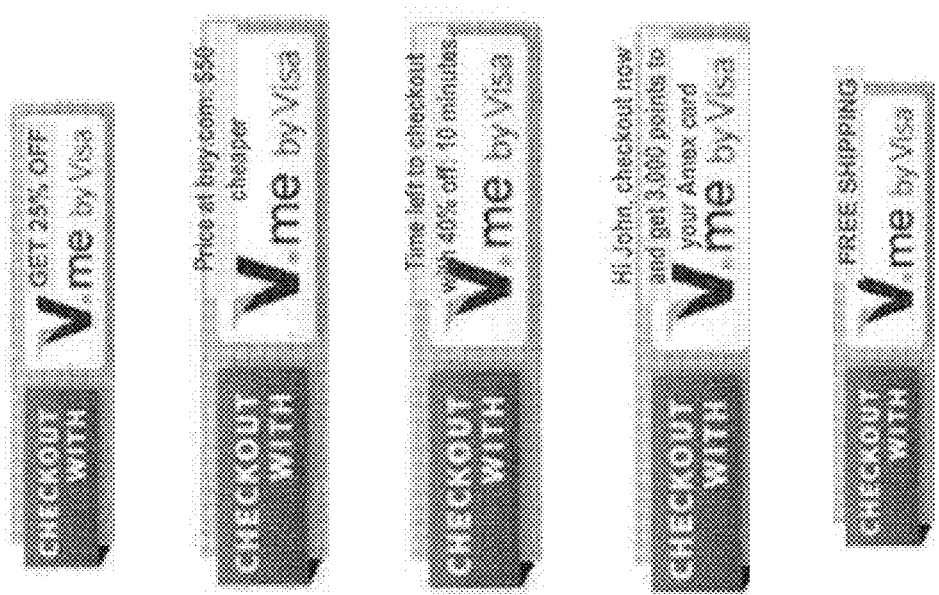
FIG. 5 shows additional example embodiments of the DCB.

FIGS. 4 and 5 illustrate the wide scope of the systems and methods described herein. As shown in FIGS. 4 and 5, the systems and methods may be configured to have many different types of checkout buttons 260 used in the processing described above. These include, but are not limited to dynamic texts; dynamic images (including photos (e.g., photo of the consumer, photo of a favorite pet, etc.), card art, product images, or any other image or images); dynamic colors; dynamic vignettes; dynamic timers/calendars/reminders; moving images (images change over time), video, etc.

FIG. 4 depicts dynamic images at 410 including card art and other types of dynamic images. As shown in FIG. 4, the card art of the consumer's default card is placed on the checkout button 260 when the system recognizes the consumer (either by cookie, device fingerprint, etc.) and the consumer has a type of "remember me" capability enabled. If these conditions are satisfied in this example, the system will serve a button 260 back as depicted in FIG. 4. The card with the chevron (upper checkout button 260 in FIG. 4) is the unrecognized button 260, and the card with a design (lower checkout button 260 in FIG. 4) represents where the recognized default card art would go. The card art could be, for example, the consumer's Bank of America Rewards Card. In some embodiments, the card art may represent which account of several accounts a user is using for the present transaction. For example, a user may have a Bank of America Rewards Card and a Local Bank Card and the card art may visibly represent which card is being used for a particular transaction.

In some embodiments, a user may be able to select the art that is displayed as part of the transaction to make it easier to determine which account is being used for a transaction. For example, Bank of America may have card art 410 available which replicates the look of a Bank of America card in possession of the user. In addition, a user may be able to select or create additional card art 410 that represents an account. An older user may wish to have larger lettering for example and the lettering may be modifiable by a user. Another user may wish for a first card to be colored red indicating that the card already has a high balance and should not be used and another card may be colored green indicating the card does not have a balance and should be used.

In yet a further embodiment, the card art 410 may indicate the balance in the account related to the payment device or card. As an example, a user may set balance limits and if the amount in an account is over or under the limit, the card art 410 may change. The threshold may be set by the user or may be set by the issuer or may be set by an authority and the threshold may use real time communication and account data to set the appearance to indicate a current status of one or more of the accounts to a user.

In yet another embodiment, the card art 410 may indicate the results of an algorithm that analyzes a variety of factors to recommend one payment account over another. The factors could include the retailer, the type of good or service to be purchase, the price of the good or service, the rewards offered for using each payment account for different goods or services at different vendors, etc. As a more specific example, if the user wants to maximize the cash back from payment devices and the user is buying gasoline, the algorithm may review the various accounts of the user to determine which account would result in the largest cash back reward.

The card art 410 may also include additional computer executable instructions that may affect the display in the button. For example, the computer executable instructions may also include instructions for the card art 410 to flash, move, change color, change in size or make a sound. For example, as the user swipes to pay, the size of the card art 410 may increase or a given sound may play. The display change may be user selected or may be selected by the card issuer, the issuing bank, etc.

FIG. 5 depicts other non-limiting examples of dynamic images at 510. These include discount information that may change over time. For example, the discount may be a 25% a first point in time but at a different discount level at a subsequent period in time. As another example, information that dynamically changes over time may be inserted into the checkout button 260 including not only what the price or discount may be, but also the specific store or website containing such an offer. The checkout button 260 and further include a continuously updated clock (e.g., a five-minute, one minute, 15 second interval). Still further, a checkout button 260 may be customized to include personal information such as the user's name as well as earning rewards (e.g., points, free shipping, etc.) by the user selecting the checkout button 260. Customization in this way operates as a further enticement for the user to effect a purchase via the checkout button 260.

Figure 6:
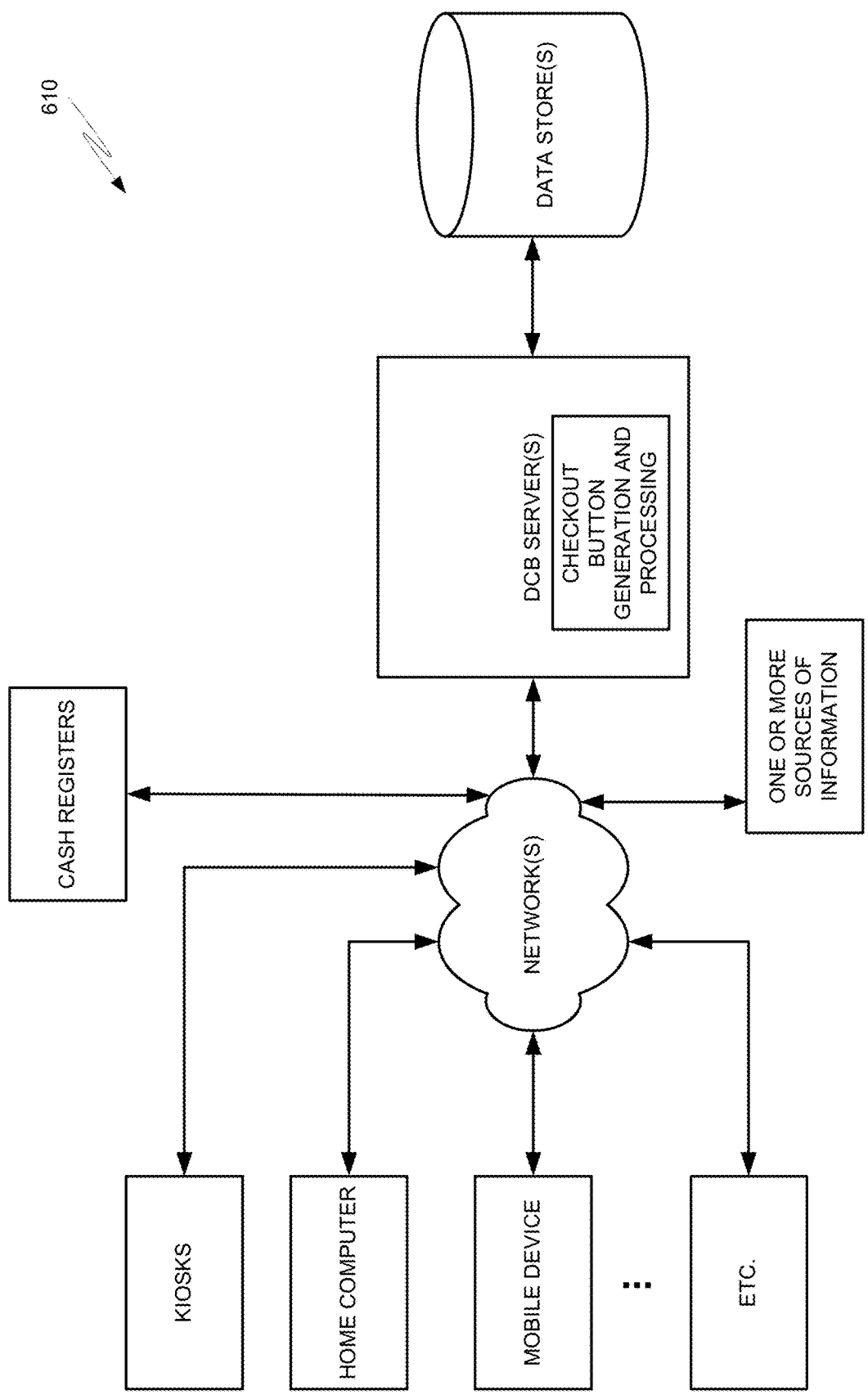
FIGS. 6 and 7 show block diagrams illustrating additional example data flow in some embodiments of the DCB.

FIG. 6 depicts at 610 that checkout buttons 260 may be supported via many different types of end touchpoints (e.g., web, mobile, wearables, kiosks, cash registers, other touchscreen devices, etc). To help in achieving personalization at these touchpoints, information may be obtained from various sources. Sources may include what information the user has already provided to an issuer and/or merchant. In some situations, information already stored at the issuer and/or merchant servers may be combined in order to derive the proper personal information (e.g., textual information, image information, etc.) to be inserted into a checkout button. Other sources of information that may be used independently or in conjunction with the aforementioned include information stored in cookies on the user's device. Cookies may include those that track user's shopping behavior across one or more shopping-related or other type of websites.

For example user-specific information may be obtained so that the person's purchase card(s), username, or other specific information may be utilized in dynamically creating a checkout button 260. Other customizations may include analyzing the purchase history of the user and determining what products the customer has a higher probability of purchasing. As another example, the system may determine that the user frequents the merchant's website and therefore qualifies to have a better offer placed in the checkout button 260. In other situations, the deeper the relationship between the user and/or the merchant and/or the issuer, the more user-specific and/or generous offers/data may be placed in the checkout button 260.

Code to enable obtaining merchant information to display in the button 260 may be as follows:

```
var r = new XMLHttpRequest( ), url;
url = locationOrigin( ) + '/wallet-services-web/merchant?profileOwner=' +
    _param('externalClientId') + '&profileName=' + _param('externalProfileId'); (this is
the api for getting the merchant's information)
    r.open('GET', url, true);
    r.setRequestHeader('Accept','application/json');
```

```
    r.setRequestHeader('Content-type','application/json');
    r.setRequestHeader('API_KEY', _param('apikey'));
    r.setRequestHeader('X-MERCHANT-API-KEY', _param('apikey'));
    r.setRequestHeader('X-CORRELATION-ID', '<%= response.getHeader("X-
CORRELATION-ID") %>');
    r.onreadystatechange = function( ) {
        if (r.readyState == 4) {
            if (r.status === 401) {
                <% /* if not active, hide button (by sending postMessage) */ %>
                // have to send it with this admittedly odd format to match our existing
                // post-message handling in the wrapper post_message.js
                window.parent.postMessage('hide--{ }', postMessageTarget); (A hidden button
would not be visible to users)
            } else if (r.status === 400 || r.status === 404) {
                window.parent.postMessage('lockButton--{ }', postMessageTarget); (A locked
button would be greyed out but visible to users)
            } else if (r.status === 200) { (Merchant is active, api key is valid, so render the
dynamic button)
                <% /* send some merchant config params back to sdk, which will pass them into
checkout widget via the url */ %>
                if(browserLocale){
                    window.parent.postMessage('merchantConfig--' + r.responseText+'--{ }--
'+'{"vInitRequest":{"browserLocale":"'+browserLocale+'"}}', postMessageTarget);
                } else {
                    window.parent.postMessage('merchantConfig--' + r.responseText,
postMessageTarget);
                }
            }
        }
    };
    r.send( );
```

In some embodiments, a decision may be made whether to render the button 260 or hide the button 260 depending on a response from a wallet server. For example, if card art is available, it may be displayed and if there is no card art, the button 260 image may be a default image. Sample computer executable instructions to enable the render or hide the art in the button 260 decision may be as follows:

```
var _lockedButtonPathSmall = 'checkout-widget/resources/img/integration/v1/locked-button-
s.png',
    _lockedButtonPathMedium = 'checkout-widget/resources/img/integration/v1/locked-button-
m.png',
    _lockedButtonPathLarge = 'checkout-widget/resources/img/integration/v1/locked-button-
l.png', (for showing a locked button to the user)
_lockButton = function(message, handleClick) {
    var images = document.getElementsByTagName('img'),
        vButtonPattern = /\bv-button\b/,
        clickHandler = function( ) {
            window.alert(message);
        },
        newWidth,
        i;
    for (i = 0; i < images.length; i++) {
        if (vButtonPattern.test(images[i].className)) {
            newWidth = _param('size',images[i].src) || 213;
            if (handleClick) {
                images[i].onclick = clickHandler;
            }
            images[i].title = message;
            images[i].src = _getAssetsDomain( );
            switch (true) { (determine correct locked button image to show based on merchant's
preference via a "size" parameter merchant passes to us)
                case parseInt(newWidth, 10) < 213:
                    images[i].src += _lockedButtonPathSmall;
                    break;
                case parseInt(newWidth, 10) >= 425:
                    images[i].src += _lockedButtonPathLarge;
                    break;
                default:
                    images[i].src += _lockedButtonPathMedium;
            }
        }
    }
}
```

```
        _isLocked = true;
    },
_hideButton = function( ) {
    var buttonElements = window.parent.document.querySelectorAll('.v-button'),
        buttonElement,
        buttonIndex;
    for (buttonIndex = 0; buttonIndex < buttonElements.length; buttonIndex++) {
        buttonElement = buttonElements[buttonIndex];
        buttonElement.style.visibility = 'hidden';
    }
},
_receiveMessage = function(event) {
    var message = event.data.split('--'),
        data = { },
        error,
        sdkOptions,
        hideWidget,
        v1Merchant;
    if (message.length > 1) {
        data = JSON.parse(message[1]);
        if (message.length > 2) {
            error = JSON.parse(message[2]);
        }
        if (message.length > 3) {
            sdkOptions = JSON.parse(message[3]);
        }
    }
    if (data.merchantType !== 'v1') {
        data.vInitRequest = _merchantOpts;
    }
    delete data.merchantType;
    if (event.origin === _getDomain( )) {
        switch(message[0]) {
            case "success" :
                try {
                    _successCallback(data);
                }finally{
                    _hide( );
                }
                break;
            case "cancel" :
                try {
                    _cancelCallback(data);
                }finally{
                    if (hideWidget) {
                        _hide( );
                    }
                }
                break;
            case "error" :
                try {
                    _errorCallback(data, error);
                }finally{
                    if (hideWidget) {
                        _hide( );
                    }
                }
                break;
            case "lock" :
                _errorCallback(data);
                if (hideWidget) {
                    _hide( );
                }
                break;
            case "hide" :
                _hideButton( );
                break;
            case "lockButton" :
                _lockButton(_integrationError, false);
                break;
            case "merchantConfig":
                if(sdkOptions.vInitRequest && sdkOptions.vInitRequest.browserLocale){
                    data.vInitRequest.browserLocale = sdkOptions.vInitRequest.browserLocale;
                }
                _merchantConfig(data);
                break;
        }
    }
},
```

```
V.setOptions = function(options) {
   var buttons = document.querySelectorAll('.v-button'),
      i;
      for (i = 0; i < buttons.length; i++) {
         buttons[i].src = _getAssetsDomain( ) + '/wallet-services-web/xo/button.png'; (if we are
going to render an active button then we make another call to Wallet Services Back End to get
the image)
         buttons[i].title = '';
      }
      // need to pass this to iframe due to security policy
      options.parentUrl = window.location.href;
      _merchantOpts = options;
   _getMerchantConfig(options);
};
```

Logically, the computer executable instructions may be embodied in a purpose built processor or may be executed by another processor that is physically configured according to the computer executable instructions.

Figure 7:
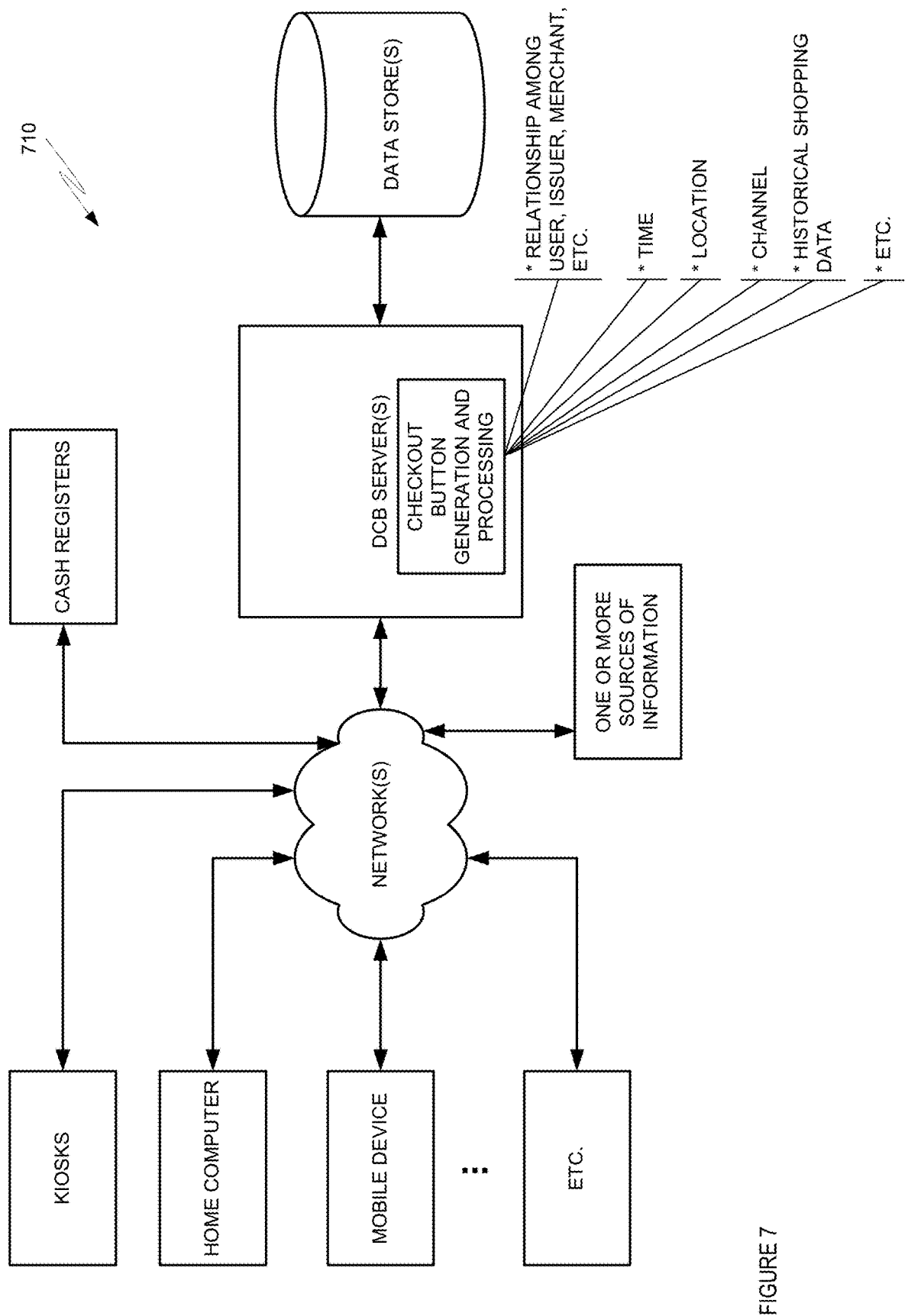

As shown at 710 in FIG. 7, the content of the checkout button 260 may be based on many different types of data. For example, the time and location of the user may also be ascertained to supplement the information that is to be processed in order to generate the textual/image data for insertion into a checkout button 260. The textual/image data may also be tailored to the specific channel of the user (e.g., the user is on a mobile phone versus the user being at a kiosk or at a merchant-operated cash register).

In another aspect, the checkout button 260 may be adapted to receive confirmation information from a user. In some embodiments, data may be requested as confirmation or as a password to enable a wallet type payment device. A wallet type payment device may be an electronic application or dedicate device in which a user enters the relevant information for a payment account and gives the account a nickname and a password. In the future, in order to use the payment account, a user may only need to enter the nickname and password or, in some cases, the nickname will be known and only the password may be needed.

In some instances, passwords were accepted in a different screen or interface which may confuse user as they are not confident they are in the same app. As illustrated in FIGS. 8A, B, 9A-9C, and 10A-10C, the checkout button 260 may expand or morph in a visually pleasing or interesting manner into an additional graphical user input display. As a result of the improved graphical user interface, users may be comfortable that their electronic device has not been hacked or that they are sharing their personal data with a different entity.

The checkout button 260 may expand or morph in a variety of ways. In one embodiment as illustrated in FIGS. 8A and 8B, the checkout button 260 itself my change into an input field 263. The user may be able to enter a password or other desired information into the space of the input field 263. The input field 263 may be highlighted by a different color, by a border, by a flashing color or by any of a number of visual cues that may be available.

In another embodiment as illustrated in FIGS. 9A-9C, the checkout button 260 may expand in a linear or non-linear fashion to create the additional graphical user input display 263. The expansion may be toward an area of the display where there is room to display a larger input display 263. The border of the checkout button 260 may be visually similar and may outline the additional input display 263. The color of the checkout button 260 may be carried over to the additional graphical user input display. In another embodiment, the color of the expanded graphical user input display 263 may be set by the account issuer. In yet another embodiment, the color of the additional graphical user input display 263 may be set by a user to assist the user in recognizing the account and the related password.

Figure 10C:
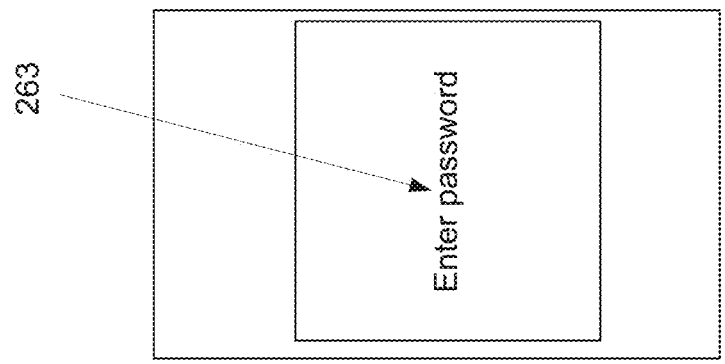
FIGS. 10A-10C shows an illustration of a checkout button morphing into a password entry field; and, FIG. 11 shows a block diagram illustrating embodiments of a DCB controller.
Figure 10B:
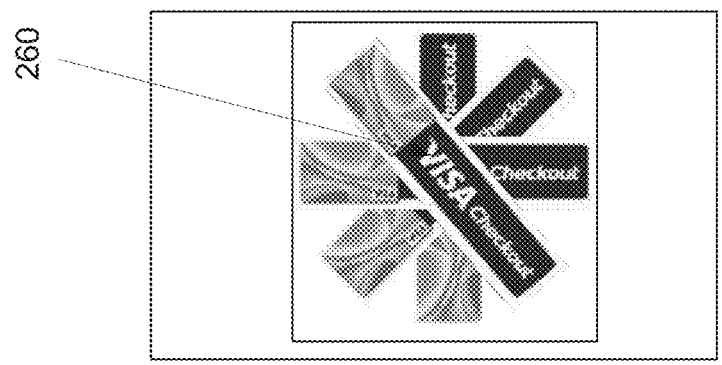
Figure 10A:
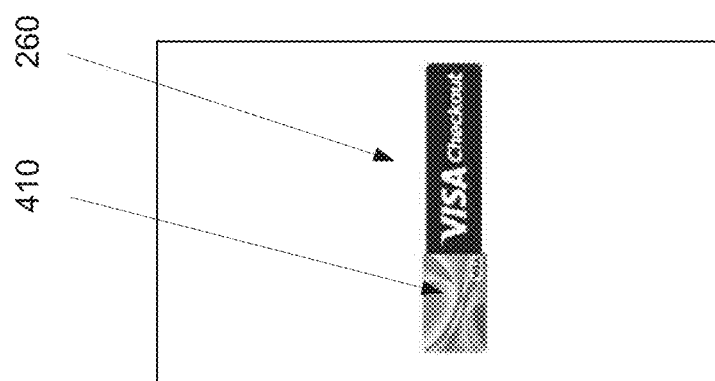

In another embodiment, the checkout button 260 may execute a more visual, graphical transformation. In one embodiment as illustrated in FIGS. 10A-10C, the checkout button 260 may spin and stop spinning into the form of the larger additional graphical user input display 263. In another embodiment, the checkout button 260 may appear to explode and reform into a larger additional graphical user input display 263. In yet another embodiment, the checkout button 260 may overly expand and then shrink to the desired size. Of course, the manner of morphing the checkout button 260 into the additional graphical user input display 263 may only be limited by the imagination. Of course, the user may be able to select or design their own manner of having the checkout button 260 change in a desired manner into the graphical user input display 263, which may have meaning to the user.

The additional graphical user input may have a specific look and feel. The look and feel may include the size, color, font, line weight and location of the graphical user input. In embodiments where the user is recognized, the additional graphical user input display 263 may mimic the look and feel or shape and color of the checkout button 260 and may expand to display the graphical user input display with an input area 263 for a password.

In addition, a sign on button may be displayed as part of the additional graphical user input display 263. Assuming the user is known, the user may only have to type in a password in the additional graphical user input display 263.

In embodiments where card art is available, the user may recognize the account that is being used and the user may recall the password for that specific account. Of course, a user may not immediately recall an account and a password from seeing card art for an account. Thus, a "forgot" button (not shown) may be provided along with an account indication that is known by the payment application. The account indication may provide a clue of the account that is known by the payment system such as part of an account name, part of an unique code like an email address, a user name, an account issuer, etc.

If the user does not recall the account even with the account indication, the user may be able to select the "forgot" button to receive a link to reset an account password. In another embodiment, the "forgot" button may provide an additional clue previously created by the user such as "pet name" or "high school" which may remind the user of the password for the account in the payment system.

If the password or verification data is accepted, acceptance feedback may be generated. The acceptance feedback may be pre-set, may be account specific, or may be selected by a user. In one embodiment, the acceptance feedback may be an acceptance display and the acceptance display may also be another form related to the checkout button 260. In one embodiment, the checkout button 260 may display that a transaction was successful. In another embodiment, the additional graphical user interface may display that the transaction was a success. The visual feedback may be designed to work alone or in concert with other forms of acceptance feedback. As an example and not a limitation, the checkout button 260 and graphical user input display 263 may turn green if a password is accepted and may turn another color is the password is not accepted.

In yet another embodiment, the acceptance feedback may be directed to another sensory function such as a sound. Like the visual acceptance feedback, the sound may be a single consistent sound. In other embodiments, the sound may be specific to the account that was used for the transaction. In yet another embodiment, the user may select the sound to be played as the acceptance feedback. The sound feedback may be designed to work alone or in concert with other forms of acceptance feedback.

In yet another embodiment, the acceptance feedback may be a physical vibration or movement of the portable computing device 202, which may be used to operate the wallet app. The physical feedback may be preset, may be set based on the payment account used, or may be set by a user. The physical feedback may be designed to work alone or in concert with other forms of acceptance feedback.

If the user is not recognized such as when the first time a user uses a payment system, a payment account creation field may be part of the additional graphical user input display 263. The payment account creation field may be a plurality of fields that accept enrollment data which may be communicated to an authority computing system 802 to verify the data. Portions of the data may be stored locally such as in an electronic file such as an electronic cookie such that only a password may be needed in the future. Similarly, the user preferences may be stored in an electronic file or may be stored remotely. Similar to acceptance feedback, new account creation feedback may be used and may take on variety of forms such as visual, aural or motion.

The additional graphical user input display 263 may be implemented in a variety of ways. In one embodiment, a call may be made back to the DCB Controller to receive the digital data necessary to create and manage the additional graphical user input display as the display may be unique per user and per account. In other embodiments, the digital data to create the additional graphical user input display 263 may be stored locally in a transitory or non transitory memory. In some embodiments, some of the digital data may be stored locally and some may be stored remotely. The digital data may be in a variety of formats and may enable the additional graphical user interface input display 263 using a variety of programming languages and techniques. The computer executable instructions may be similar to the instructions to render card art in the checkout button 260 as described previously in this application.

As a result, a greater degree of branding may be placed in the checkout buttons 260, such as colors that help identify the merchant or other company or logos of the merchant or other company. Because "real estate" is at a premium for a checkout button 260 (e.g., a two inch-by-one inch sized checkout button 260), the data (e.g., images, text, etc.) may be tailored to the specific merchant and/or user in order to enhance the probability that the user will click on the checkout button 260.

In addition, in the past, users were not confident that they were providing a password to the appropriate application. When the additional graphical user interface 263 is provided, the submission of a password may feel more natural and may provide more confidence to a user. The problem of a user wondering if the password input is a "phishing" application or is a legitimate password input will be reduced. In addition, more loyalty to the wallet application may be created by creating a graphical user interface which instills more confidence in a user that the password is being communicated to the intended party and is an integrated aspect of the wallet application.

DCB Controller

Figure 11:
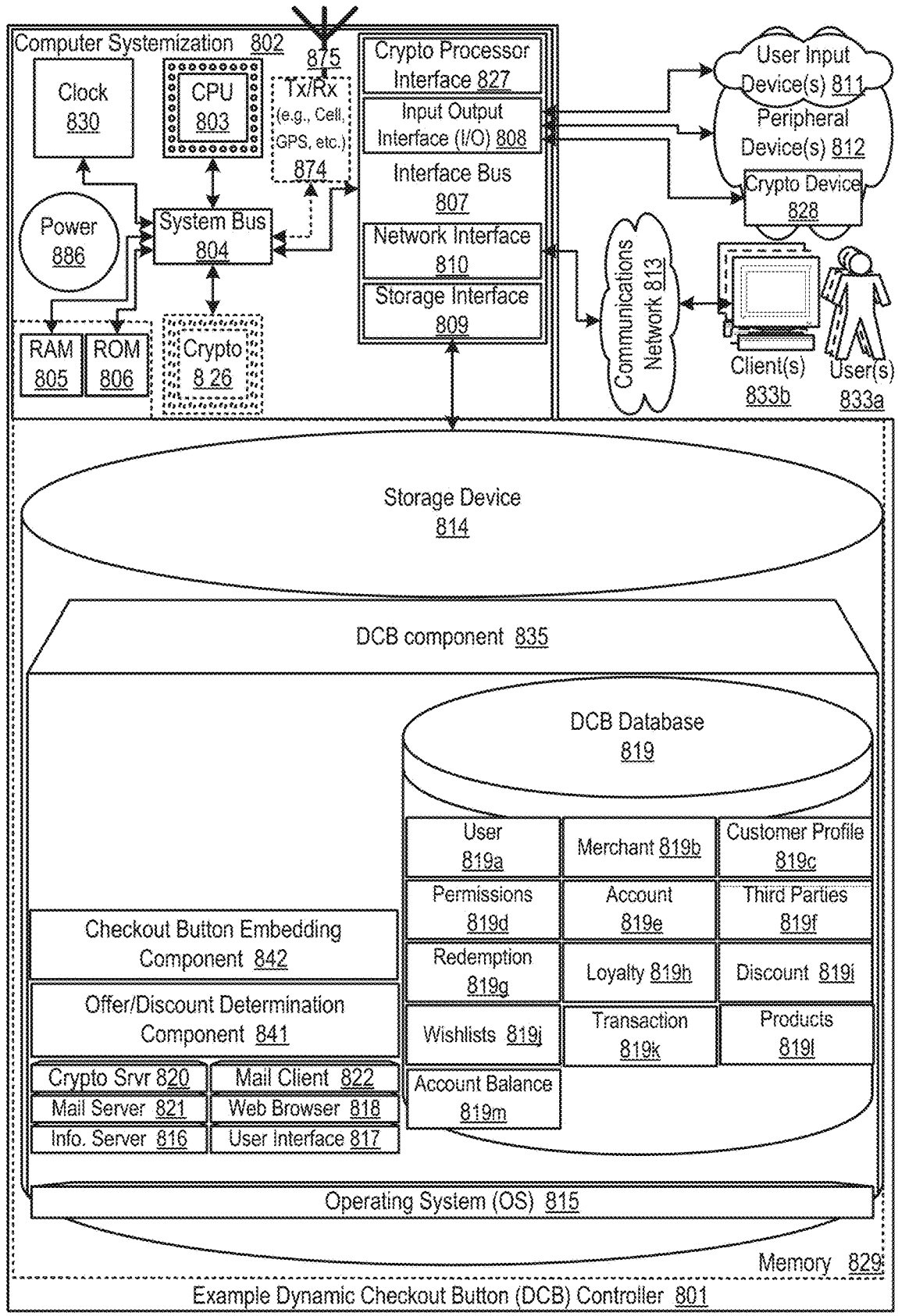

FIG. 11 shows a block diagram illustrating embodiments of a DCB controller. In this embodiment, the DCB controller 801 may serve to aggregate, process, store, search, serve, identify, instruct, generate, match, and/or facilitate interactions with a computer through various bi-directional linking technologies, and/or other related data.

Typically, users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DCB controller 801 may be connected to and/or communicate with entities such as, but not limited to: one or more users from user input devices 811; peripheral devices 812; an optional cryptographic processor device 828; and/or a communications network 813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DCB controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeably throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effectuate communications, operations, storage, etc. The computer systemization 802 may be connected to a power source 886; e.g., optionally the power source may be internal. Optionally, a cryptographic processor 826 and/or transceivers (e.g., ICs) 874 may be connected to the system bus 804. In another embodiment, the cryptographic processor 826 and/or transceivers may be connected as either internal and/or external peripheral devices 812 via the interface bus I/O. In turn, the transceivers may be connected to antenna(s) 875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DCB controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock 830 typically has a crystal oscillator and generates a base signal through the computer systemization's circuit pathways. The clock 830 is typically coupled to the system bus 804 and various clock multipliers that will increase or decrease the base operating frequency for other components interconnected in the computer systemization. The clock 830 and various components in the computer systemization 802 drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU 803 may comprise at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state. The CPU 803 may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU 803 interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DCB controller 801 and beyond through various interfaces. Should processing requirements dictate a greater amount speed and/or capacity, distributed processors (e.g., Distributed DCB), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DCB may be achieved by implementing a microcontroller such as CAST's R8051XC2 microcontroller; Intel's MCS 51 (i.e., 8051 microcontroller); and/or the like. Also, to implement certain features of the DCB, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DCB component collection (distributed or otherwise) and/or features may be implemented via the microprocessor and/or via embedded components; e.g., via ASIC, coprocessor, DSP, FPGA, and/or the like. Alternately, some implementations of the DCB may be implemented with embedded components that are configured and used to achieve a variety of features or signal processing.

Depending on the particular implementation, the embedded components may include software solutions, hardware solutions, and/or some combination of both hardware/software solutions. For example, DCB features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the DCB features. A hierarchy of programmable interconnects allow logic blocks to be interconnected as needed by the DCB system designer/administrator, somewhat like a one-chip programmable breadboard. An FPGA's logic blocks may be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DCB may be developed on regular FPGAs and then migrated into a fixed version that more resembles ASIC implementations. Alternate or coordinating implementations may migrate DCB controller features to a final ASIC instead of or in addition to FPGAs. Depending on the implementation all of the aforementioned embedded components and microprocessors may be considered the "CPU" and/or "processor" for the DCB.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the DCB thereby providing an electric current to all subsequent components. In one example, the power source 886 is connected to the system bus component 804. In an alternative embodiment, an outside power source 886 is provided through a connection across the I/O interface 808. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus 807 provides for the communications of interface adapters with one another as well as with other components of the computer systemization 802. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the DCB controller 801 is accessible through remote clients 833b (e.g., computers with web browsers) by users 833a. Network interfaces 810 may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DCB), architectures may similarly be employed to pool, load balance, and/or otherwise increase the communicative bandwidth required by the DCB controller 801. The communications network 813 may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O 808 may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 811 often are a type of peripheral device 812 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 812 may be connected and/or communicate to I/O 808 and/or other facilities of the like such as network interfaces 810, storage interfaces 809, directly to the interface bus 807, system bus 804, the CPU 803, and/or the like. Peripheral devices 812 may be external, internal and/or part of the DCB controller 801. Peripheral devices 812 may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices 811 and peripheral devices 812 may be employed, the DCB controller 801 may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the DCB controller 801. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory 829 is a fungible technology and resource, thus, any number of memory embodiments may be employed in lieu of or in concert with one another. It is to be understood that the DCB controller 801 and/or a computer systemization 802 may employ various forms of memory 829. For example, the computer systemization 802 may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the DCB component(s) 835; offer/discount determination component 841; checkout button 260 embedding component 842; and/or the like (i.e., collectively a component collection). These components may be stored and accessed from the storage devices and/or from storage devices accessible through an interface bus. Although non-conventional program components such as those in the component collection, typically, are stored in a local storage device such as storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the DCB controller 801. Typically, the operating system 815 facilitates access of I/O 808, network interfaces 810, peripheral devices 812, storage devices 814, and/or the like. The operating system 815 may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. The operating system may communicate to and/or with other components in a component collection, including itself, and/or the like. Most frequently, the operating system communicates with other program components, user interfaces, and/or the like. For example, the operating system 815 may contain, communicate, generate, obtain, and/or provide program component, system, user, and/or data communications, requests, and/or responses. The operating system 815, once executed by the CPU 803, may enable the interaction with communications networks, data, I/O, peripheral devices, program components, memory, user input devices, and/or the like. The operating system may provide communications protocols that allow the DCB controller 801 to communicate with other entities through a communications network 813. Various communication protocols may be used by the DCB controller 801 as a subcarrier transport mechanism for interaction, such as, but not limited to: multicast, TCP/IP, UDP, unicast, and/or the like.

Information Server

An information server component 816 is a stored program component that is executed by the CPU 803. The information server 816 may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server 816 may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DCB controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server 816 may communicate to and/or with other components in a component collection, including itself, and/or facilities of the like. Most frequently, the information server communicates with the DCB database 819, operating systems, other program components, user interfaces, Web browsers, and/or the like.

Access to the DCB database 819 may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DCB. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DCB as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 817 is a stored program component that is executed by the CPU 803. The user interface 817 may be a conventional graphic user interface as provided by, with, and/or atop operating systems and/or operating environments such as already discussed. The user interface 817 may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface 817 may contain, communicate, generate, obtain, and/or provide program component, system, user, and/or data communications, requests, and/or responses.

Web Browser

A Web browser component 818 is a stored program component that is executed by the CPU 803. The Web browser 818 may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, a Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DCB enabled nodes. The combined application may be nugatory on systems employing standard Web browsers.

Mail Server

A mail server component 821 is a stored program component that is executed by the CPU 803. The mail server 821 may be a conventional Internet mail server such as, but not limited to sendmail, Microsoft Exchange, and/or the like. The mail server 821 may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server 821 may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server 821 may route, forward, and process incoming and outgoing mail messages that have been sent, relayed and/or otherwise traversing through and/or to the DCB.

Access to the DCB mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by the CPU 803. The mail client 822 may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client 822 communicates with mail servers, operating systems, other mail clients, and/or the like; e.g., it may contain, communicate, generate, obtain, and/or provide program component, system, user, and/or data communications, requests, information, and/or responses. Generally, the mail client 822 provides a facility to compose and transmit electronic mail messages.

Cryptographic Server

A cryptographic server component 820 is a stored program component that is executed by the CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DCB may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DCB component to engage in secure transactions if so desired. The cryptographic component 820 facilitates the secure accessing of resources on the DCB and facilitates the access of secured resources on remote systems; i.e., it may act as a client and/or server of secured resources. Most frequently, the cryptographic component 820 communicates with information servers, operating systems, other program components, and/or the like. The cryptographic component 820 may contain, communicate, generate, obtain, and/or provide program component, system, user, and/or data communications, requests, and/or responses.

The DCB Database

The DCB database component 819 may be embodied in a database and its stored data. The DCB database 819 is a stored program component, which is executed by the CPU 803; the stored program component portion configuring the CPU to process the stored data. The DCB database 819 may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DCB database 819 may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases may include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DCB database 819 is implemented as a data-structure, the use of the DCB database 819 may be integrated into another component such as the DCB component 835. Also, the DCB database 819 may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the DCB database component 819 includes several tables 419*a-m*. A user table 819*a* includes fields such as, but not limited to: a user_ID, name, home_address, work_address, telephone_number, email, merchant_ID client_id, account_id, and/or the like. The user table may support and/or track multiple entity accounts on a DCB. A merchant/service provider table 819*b* includes fields such as, but not limited to: merchant_ID, merchant_name, merchant_location, merchant_address, merchant_category_code, merchant_api_key, loyalty_program_ID and/or the like. A customer profile table 819*c* includes fields such as, but not limited to: user_ID, merchant_ID, payment_card_ID, preferred_payment_type, demographics, merchant_loyalty_level, and/or the like. A permissions table 819*d* includes fields such as, but not limited to: customer_ID, transaction_execution authorization_status, confirmation_authorization_status, billing_authorization_status, subscription_payment_authorization_status, and/or the like. A payment account/card table 819*e* includes fields such as, but not limited to: payment_card_id, user_id, identifier, brand, expiration_date, spending_limit, billing_address, issuer, name, nick_name, loyalty_program_ID, and/or the like. A third party billing agreement table 819*f* includes fields such as, but not limited to: customer_id, billing_id, billing_date, billing_amount_limit, confirmation_requirement, authentication_level, billing_authorization_status, and/or the like. A redemption table 819*g* includes fields such as, but not limited to: customer_id, loyalty_program_id, coupon_id, redemption_date, redemption_time, redemption_amount, redemption_type, transaction_id, and/or the like. A loyalty table 819*h* includes fields such as, but not limited to: loyalty_program_ID, rules, loyalty_currency_amount, loyalty_expiry_date, transaction_ID, and/or the like. A discount table 819*i* includes fields such as, but not limited to: discount_ID, discount_value, discount_accepted_location, discount_expiry_date, and/or the like. A wishlist table 819*j* includes fields such as, but not limited to: wishlist_ID, merchant_ID, item_ID, and/or the like. A transaction table 819*k* includes fields such as, but not limited to: transaction_id, merchant_id, user_id, session_id, date, time, item_model, manufacturer, price, item_id, and/or the like. A products table 819*l* includes fields such as, but not limited to: product_id, merchant_id, item_id, and/or the like. An account balance table 819*m* includes fields such as, but not limited to: account_id, account_PAN, account_type, brand, expiration_date, spending_limit, billing_address, issuer_name, nick_name, loyalty_program_ID, and/or the like.

In one embodiment, the DCB database 819 may interact with other database systems. For example, employing a distributed database system, queries and data access by search DCB component 835 may treat the combination of the DCB database, an integrated data security layer database as a single database entity.

In one embodiment, user programs may contain various user interface primitives, which may serve to update the DCB. Also, various accounts may require custom database tables depending upon the environments and the types of clients the DCB may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819*a-m*. The DCB may be configured to keep track of various settings, inputs, and parameters via database controllers.

The DCB database 819 may communicate to and/or with other components in a component collection, including itself, and/or facilities of the like. Most frequently, the DCB database 819 communicates with the DCB component 835, other program components, and/or the like. The database may contain, retain, and provide information regarding other nodes and data.

The DCBs

The DCB component 835 is a stored program component that is executed by the CPU 803. In one embodiment, the DCB component 835 incorporates any and/or all combinations of the aspects of the DCB that was discussed in the previous Figures. As such, the DCB affects accessing, obtaining and the provision of information, services, transactions, and/or the like across various communications networks.

The DCB transforms inputs such as product page checkout request and user identification input (e.g., 211) via DCB components such as offer/discount determination component 841 and checkout button 260 embedding component 842, into dynamic checkout button 260 (e.g., 260) outputs.

The DCB component 835 enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DCB server employs a cryptographic server to encrypt and decrypt communications. The DCB component 835 may communicate to and/or with other components in a component collection, including itself, and/or facilities of the like. Most frequently, the DCB component 835 communicates with the DCB database 819, operating systems, other program components, and/or the like. The DCB may contain, communicate, generate, obtain, and/or provide program component, system, user, and/or data communications, requests, and/or responses.

Distributed DCBs

The structure and/or operation of any of the DCB node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DCB controller 801 will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DCB controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

In order to address various issues and advance the art, the entirety of this application for DYNAMIC CHECKOUT BUTTON 260 APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the Figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DCB individual and/or enterprise user, database configuration and/or relational model, data type, data transmission and/or network framework, syntax structure, and/or the like, various embodiments of the DCB, may be implemented that enable a great deal of flexibility and customization. For example, aspects of the DCB may be adapted for customized communication between entities. While various embodiments and discussions of the DCB have been directed to dynamic checkout button 260, however, it is to be understood that the embodiments described herein may be readily configured and/or customized for a wide variety of other applications and/or implementations.

The invention claimed is:

1. A computer system for generating graphical user interfaces comprising at least one central processor physically configured according to computer executable instructions, a memory for storing computer executable instructions and an input output circuit, the central processor being physically configured for:
   receiving, using one or more processors, a checkout request from a computing device having a display;
   generating, using the one or more processors, data to be embedded into a wallet-associated checkout button wherein the wallet-associated checkout button occupies an area within the display, wherein the data comprises one or more dynamic images that represent one or more financial accounts and wherein the dynamic images are displayed within the area of the display occupied by the wallet-associated checkout button;
   receiving, using the one or more processors, a payment request; and, morphing, using the one or more processors, the wallet-associated checkout button into an additional graphical user interface to receive password data associated with the one or more financial accounts.

2. The computer system of claim 1, wherein morphing the wallet-associated checkout button into an additional graphical user interface includes: expanding the wallet-associated checkout button into the additional graphical user interface which is displayed in at least one of the wallet-associated checkout button, a linear extension of the wallet-associated checkout button, or a user defined location.

3. The computer system of claim 1, wherein the additional graphical user interface includes a look and feel defined by one of the wallet-associated checkout button, an account issuer, and the user.

4. The computer system of claim 1, wherein in response to the password data being accepted, providing acceptance feedback.

5. The computer system of claim 4, wherein the acceptance feedback is at least one of a visual display, a sound, or motion feedback.

6. The computer system of claim 4, wherein the acceptance feedback is set by at least one of a payment account provider or by the user.

7. The computer system of claim 6, wherein a user's wallet account stores the user's profile information, payment methods information, and shipping address.

8. The computer system of claim 1, wherein one or more servers contain the one or more processors, and wherein the checkout request and the one or more dynamic images are transmitted over one or more communications networks.

9. The computer system of claim 1, wherein the one or more dynamic images to be embedded into the wallet-associated checkout button is to be displayed on a user's wireless mobile communications device.

10. The computer system of claim 1, the central processor being further physically configured for:
querying, using the one or more processors, for information associated with a merchant and the user.

11. The computer system of claim 1, wherein morphing the wallet-associated checkout button into the additional graphical user interface includes:
spinning the wallet-associated checkout button and stop spinning the wallet-associated checkout button into a larger additional graphical user input display.

12. The computer system of claim 1, wherein morphing the wallet-associated checkout button into the additional graphical user interface includes:
overly expanding the wallet-associated checkout button and then shrinking the wallet-associated checkout button into the additional graphical user interface.

13. The computer system of claim 1, wherein morphing the wallet-associated checkout button into the additional graphical user interface includes:
visually exploding the wallet-associated checkout button and reforming the wallet-associated checkout button into a larger additional graphical user input display.

14. A dynamic checkout button processor-implemented method, comprising:
receiving, using one or more processors, a checkout request from a computing device having a display;
generating, using the one or more processors, data to be embedded into a wallet-associated checkout button wherein the wallet-associated checkout button occupies an area within the display, wherein the data comprises one or more dynamic images that represent one or more financial accounts and wherein the dynamic images are displayed within the area of the display occupied by the wallet-associated checkout button;
receiving, using the one or more processors, a payment request; and,
morphing, using the one or more processors, the wallet-associated checkout button into an additional graphical user interface to receive password data associated with the one or more financial accounts.

15. The method of claim 14, wherein morphing the wallet-associated button into the additional graphical user interface includes: expanding the wallet-associated checkout button into the additional graphical user interface which is displayed in at least one of the wallet-associated checkout button, a linear extension of a wallet-associated checkout button, and a user defined location.

16. The method of claim 14, wherein the additional graphical user interface includes a look and feel defined by one of the wallet-associated checkout button, an account issuer, and the user.

17. The method of claim 14, wherein in response to the password data being accepted, providing acceptance feedback wherein the acceptance feedback is at least one of a visual display, a sound, or motion feedback.

18. The method of claim 17, wherein the acceptance feedback is set by at least one of a payment account provider or by the user.

19. The method of claim 17, wherein one or more servers contain the one or more processors, and wherein the checkout request and the one or more dynamic images are transmitted over one or more communications networks.

20. The method of claim 17, wherein the one or more dynamic images to be embedded into the wallet-associated checkout button are to be displayed on a user's wireless mobile communications device.

* * * * *